(12) United States Patent
Von Gal

(10) Patent No.: US 8,581,098 B2
(45) Date of Patent: Nov. 12, 2013

(54) SOCKET BOX

(75) Inventor: Paulo Cesario Von Gal, Sao Paulo (BR)

(73) Assignee: Torniplast Artefatos Plasticos Ltda (BR)

( * ) Notice: Subject to any disclaimer, the term of this patent is extended or adjusted under 35 U.S.C. 154(b) by 0 days.

(21) Appl. No.: 13/413,160

(22) Filed: Mar. 6, 2012

(65) Prior Publication Data

US 2013/0048332 A1     Feb. 28, 2013

(30) Foreign Application Priority Data

Aug. 23, 2011   (BR) ..................................... 1103720

(51) Int. Cl.
*H01H 9/02*     (2006.01)
(52) U.S. Cl.
USPC ................. 174/53; 174/50; 174/58; 174/481; 220/3.2; 220/3.3; 248/906

(58) Field of Classification Search
USPC ....... 174/480, 481, 50, 53, 57, 58, 520, 17 R; 220/3.2–3.9, 4.02; 248/906
See application file for complete search history.

(56) References Cited

U.S. PATENT DOCUMENTS

| | | | |
|---|---|---|---|
| 3,378,160 A * | 4/1968 | Bassani ........................... | 174/58 |
| 6,586,679 B2 * | 7/2003 | Bashford ........................ | 174/58 |
| 6,908,003 B2 * | 6/2005 | Feyes et al. .................... | 220/3.2 |
| 7,087,837 B1 * | 8/2006 | Gretz .............................. | 174/58 |
| 7,518,061 B1 * | 4/2009 | Gretz .............................. | 174/58 |
| 7,667,136 B2 * | 2/2010 | Dinh et al. ...................... | 174/58 |
| 7,714,227 B2 * | 5/2010 | Sparrowhawk et al. ........ | 174/50 |
| 7,759,576 B1 * | 7/2010 | Gretz .............................. | 174/58 |
| 7,902,459 B2 * | 3/2011 | Lehr .............................. | 174/481 |

* cited by examiner

*Primary Examiner* — Angel R Estrada
(74) *Attorney, Agent, or Firm* — Cantor Colburn LLP

(57) ABSTRACT

A socket box, equipped with means allowing it to be fixed to a circular opening made in the wall of a block of a building's wall upon an expansion effect of the socket box's structure, whose structure portions are displaced by using expansion screws, which, when turned, cause the socket box to be locked in opening made in block.

3 Claims, 6 Drawing Sheets

SOCKET BOX

TECHNICAL FIELD

This disclosure concerns a socket box including expandable elements incorporated to the box structure itself.

BRIEF DESCRIPTION OF RELATED ART

As it is generally known, the built-in electric installations found in the standard which is normally adopted by the civil construction comprises the use of boxes generically referred as socket boxes, which are interconnected through flexible pipes popularly known as conduits, through which the wiring is passed until it reaches the boxes, where switches, sockets, etc. are mounted.

The socket boxes are normally incorporated to the masonry still in the phase before finishing, being mounted in openings made in the blocks forming the walls, where they are fixed to.

In most recent terms and, particularly, in the scope of the apartment or commercial room building constructors, the technique of mounting socket boxes to be installed in circular openings made with electric tools equipped with hole saw, is becoming popular.

Thus, after the wall is built and before it receives the finishing, the professional responsible for the installation, using a special drilling machine equipped with a large diameter hole saw opens a circular window in the block wall at a diameter which is sufficient to receive the socket box.

The technique above represents an advance compared to the traditional techniques, once it standardizes the installation.

It happens that the boxes intended for conventional sockets used in the type of mounting described above are not appropriate for such use, once they are based on fixation systems using mobile elements driven by screws.

The conventional boxes' mobile elements are normally fragile parts mounted on hard guides incorporated to the box's wall, being such elements moved when the screw connected to them is turned.

The working system of the conventional socket boxes requires that following the opening is made on the block wall, the box is introduced into the referred opening, being positioned so that its mobile elements (not retracted yet), are passed so as to be in a position behind the internal face of the block wall at any point around the edge of the circular opening made in the referred wall.

Once the socket box is positioned, the installer starts turning, by using a screwdriver or the like, the screw which moves each of the mobile elements. The screws should be turned so that the elements advance towards the internal face of the block wall thus guaranteeing the fixation of the box and preventing it from being fixed by using mortar, such as in the traditional system.

In the practice, if the installer does not take care, he will not notice the point on which the mobile elements touch the internal face of the block and when crossing such point, if the screws continue to be turned, the elements will be submitted to a tightening force which is higher than they can resist thus causing them to break and the box becomes useless as a whole.

Thus, if only one of the elements is broken upon installation, the socket box should be discarded incurring in increased wastage, as well as waste of time.

Another inconvenient verified in the state of the art is in the fact that in most of the socket boxes models like those described above, the mobile elements, due to their position, makes the installation of the box into the opening made in the block difficult.

Such difficulty is based on the fact that the mobile elements are normally projected outwards the general diameter of the box thus requiring a certain experience so as to allow it to be inserted into the opening made in the block, which is typically very narrow.

In some cases, the mounting of the socket box requires that one of the elements is disassembled and subsequently assembled when the box has already been inserted into the block, a very complex task, requiring manual ability, and it almost always requires increased time so as to allow each conventional box unit to be mounted.

Another inconvenient verified in the state of the art relates to the fact that if the circular opening made in the block is accidentally very close to some transversal and structural walls foreseen inside the block, some of the mobile element may not have space enough to operation, thus making the mounting of the socket box as whole unfeasible, or making the installer to take improvised measures to complete the work.

In general, for all the negative aspects presented above, the installation of the socket boxes equipped with mobile elements requires increased time to mount each box unit, being also an undesirable characteristic.

BRIEF SUMMARY

Due to this state of the art, it was developed a socket box which, unlike the observed in conventional boxes, does not use mobile fixation elements as a way to fix the box to the opening made in the block part of the wall and operates through the principle of expanding the box's structure.

The principle of expanding the box's structure guarantees that it is fixed to the block not by the action of a mobile element acting through the internal face of the block wall but through the expansion force which acts on a radial basis against the edge of the circular opening where the box is positioned to, being such principle much more efficient, safe, practical and economic due to this reason.

The socket box eliminates the break problems found with respect to the conventional boxes and allows each box unit to be mounted within a substantially lower period of time.

The socket box addressed here does not have mounting problems when the circular opening made in the block wall in close to any transversal structure inside the block, once the proposed system provides a fixation method which occurs in the circular edge of the opening made in the block.

BRIEF DESCRIPTION OF THE DRAWINGS

The socket box can be understood with all its particularities through the detailed description to be conducted based on the figures listed below, on which.

DETAILED DESCRIPTION

Figure 1:
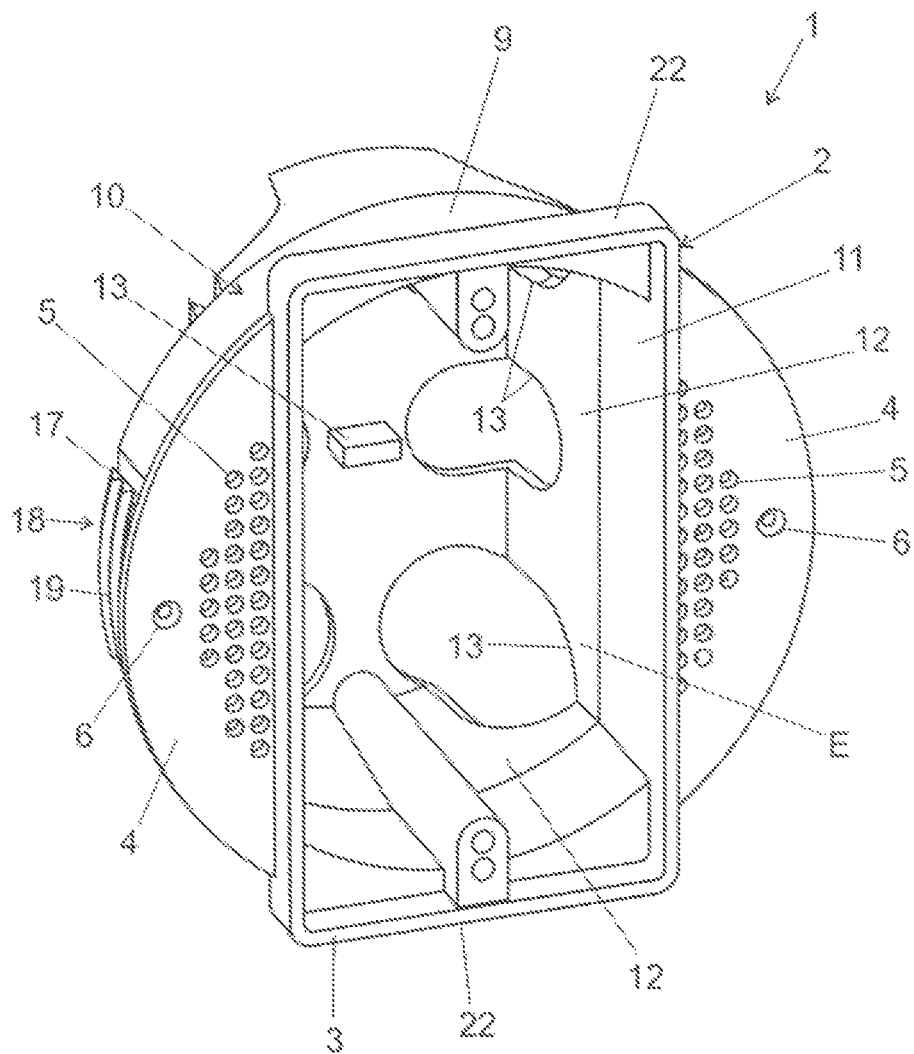
FIG. 1 show a perspective front view of a first form of accomplishing the socket box as addressed here.
Figure 1A:
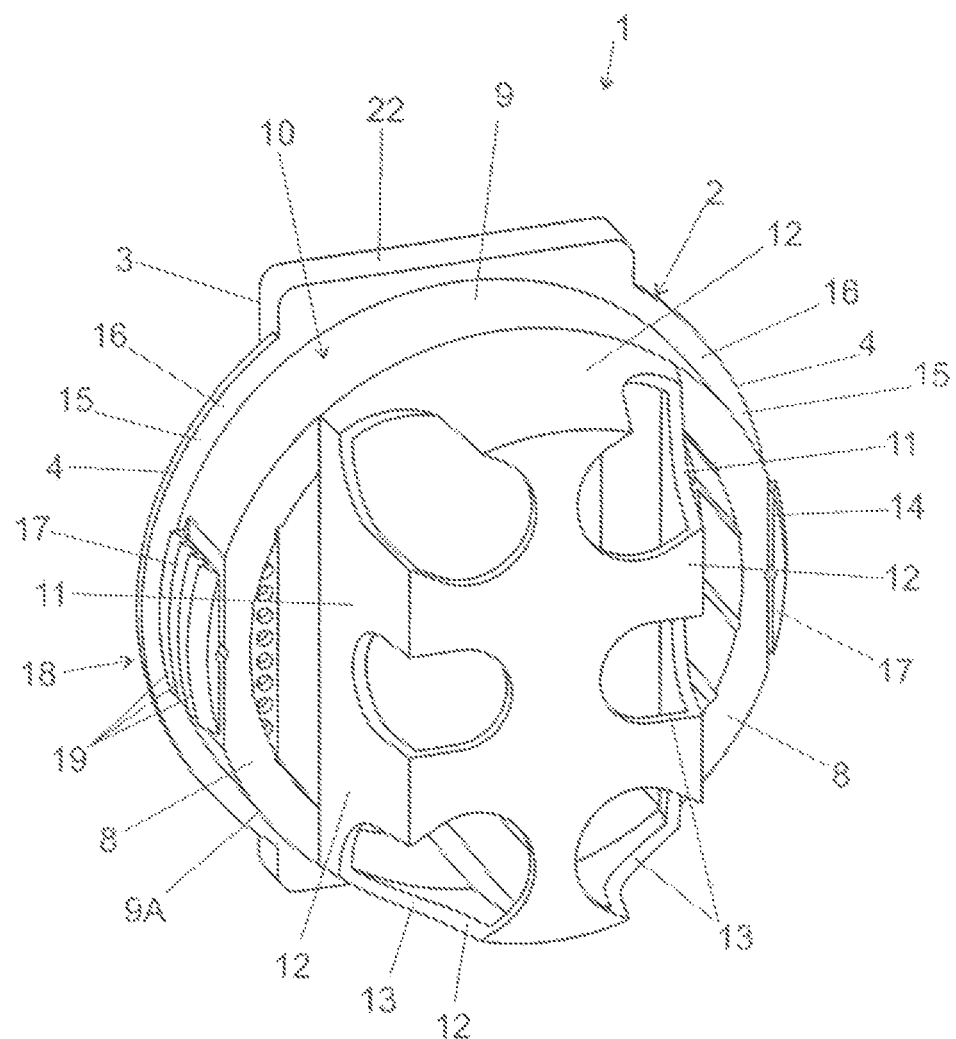
FIG. 1A shows a perspective rear view of the socket box as addressed here.
Figure 2:
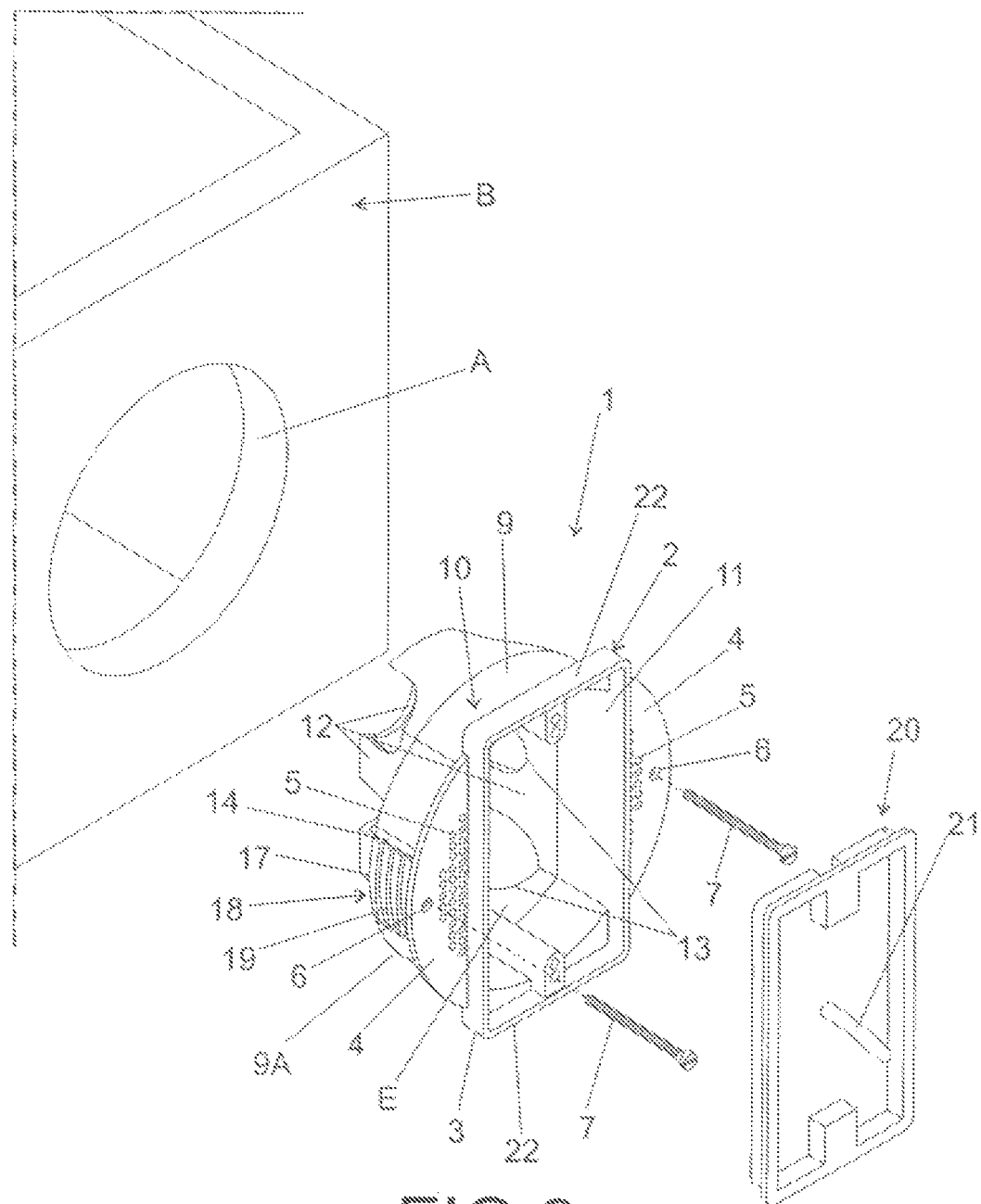
FIG. 2 schematically shows an exploded perspective view, showing a type of block used to build a wall of a building and being the same duly perforated, a model of the referred socket box, aligned with the opening made in the block wall, a pair of screws used to promote the expansion of the socket box following its assembly inside the opening made in the block wall and a transitory cap which is mounted in the socket box as referred to herein allowing it to be transitorily closed during the wall finishing step, allowing the referred cap to be subsequently removed.
Figure 3:
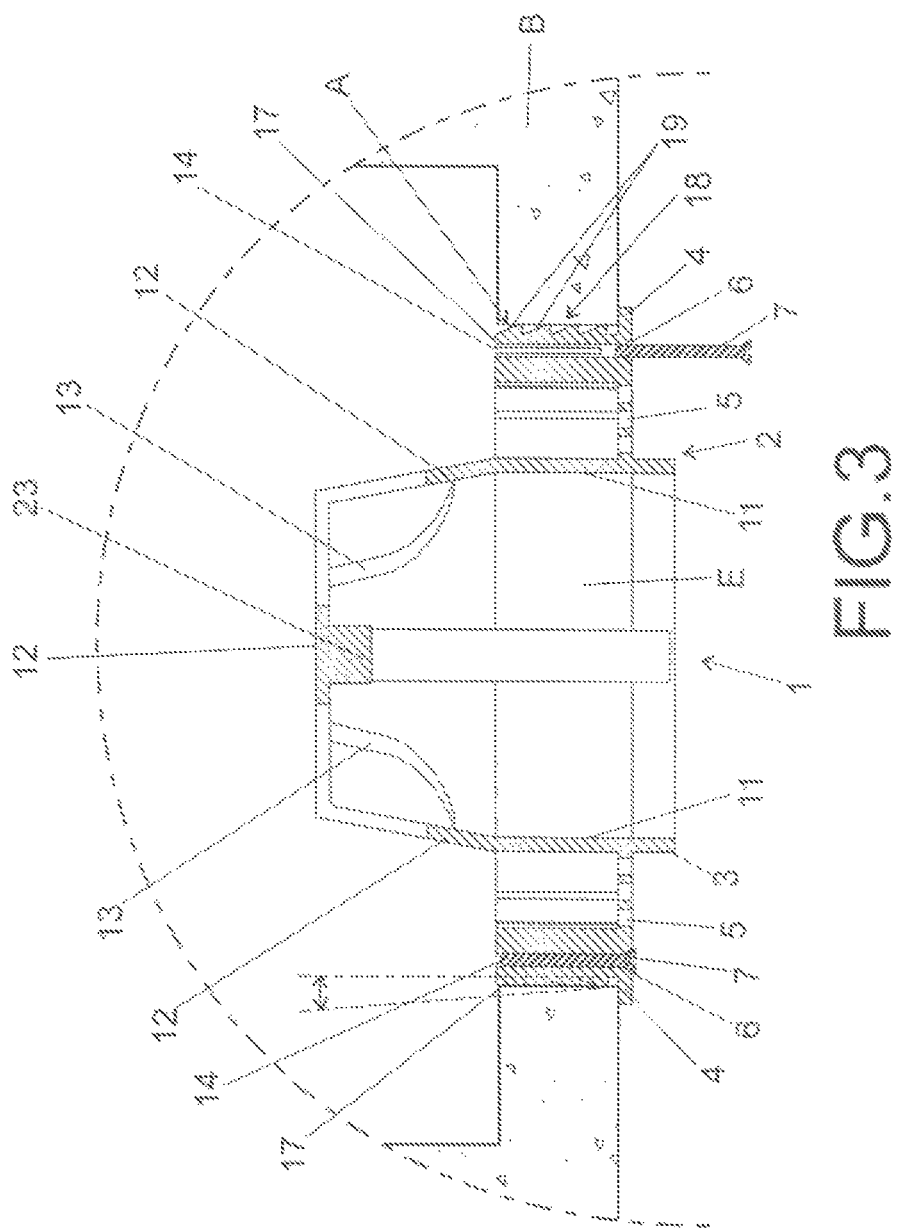
FIG. 3 shows a schematic and cut view of a block like those used to build a building's wall, to which a model of a socket box as addressed herein has been mounted, being the referred cut taken in the level of the screws used to promote the expansion of the box's structure and where one of the screws is shown in its initial position, i.e., before it causes the expansion of its respective side of the box's structure, while another screw, for the purposes of comparison, is shown totally screwed and consequently causing the full expansion of its respective side of the box's structure for the socket as addressed herein.
Figure 4:
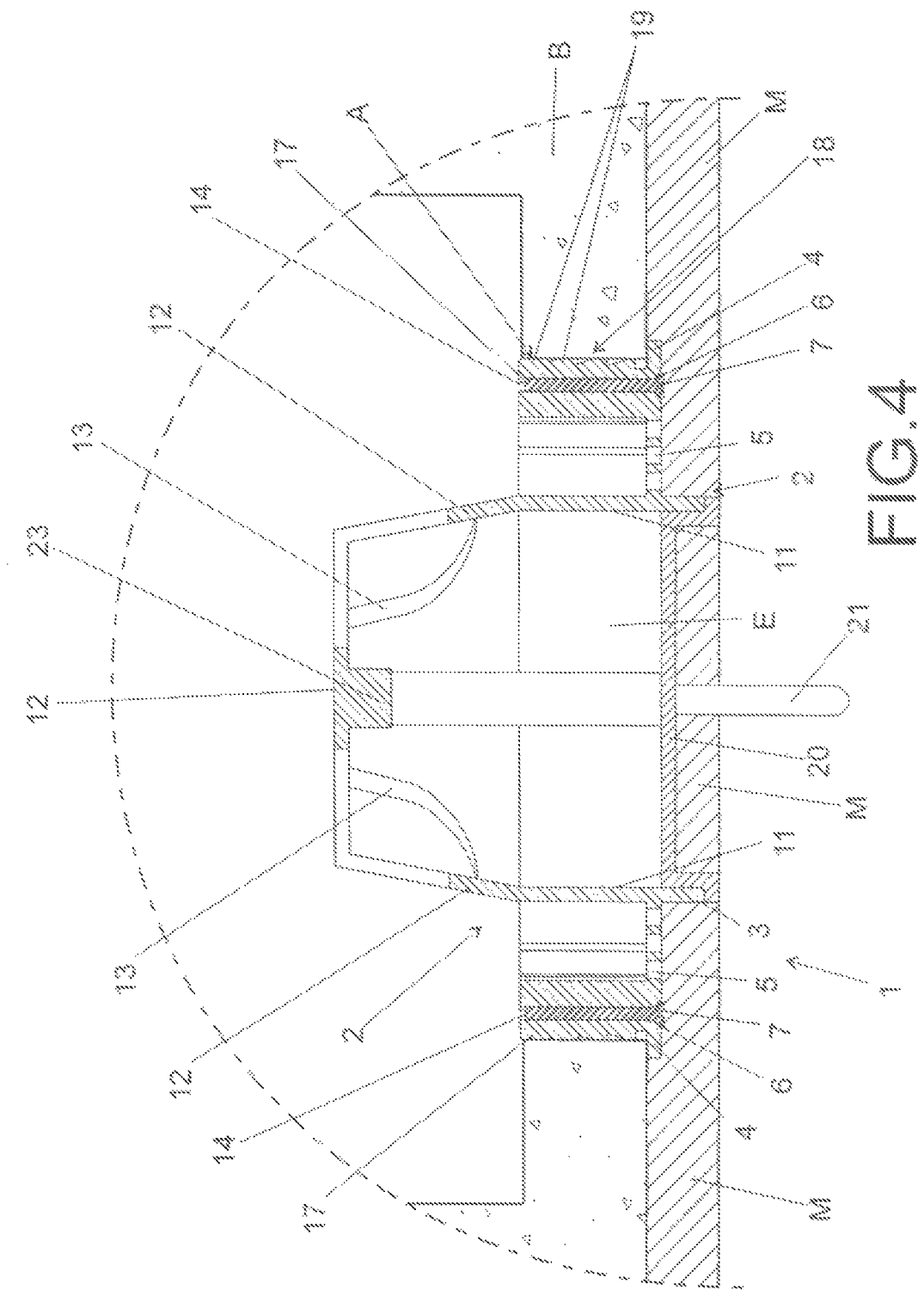
FIG. 4 show a schematic cut of a masonry wall built with blocks, being that in one of the referred block a model of the socket box as addressed herein will be mounted; such view further shows the position of the transitory cap which is used to prevent the finishing material applied over the wall and consequently over the already installed socket from entering the box; the referred transitory cap is equipped with a flexible shaft which tends to extend beyond the finishing material plane thus facilitating its localization so as to remove it as a whole.

According to what has been shown in the figures listed above, the socket box which is generally indicated by numeric reference 1 comprises a main body 2 manufactured with injected plastic, presenting a rectangular front edge 3 continuing in two semicircular lateral flaps 4, each of them with a number of pass-through holes 5 intended to retain the mortar M which is applied on the wall's surface where the present box is mounted and also over the aforementioned box, as schematically show in FIG. 4, each of the referred semicircular flaps 4 further has a hole 6 provided with threads and which receives a corresponding expansion screw 7.

The main body 2, from its rear face, is equipped with structural supports 8 compatible with the contour of each of the semicircular flaps 4, the referred structural supports 8 continue and combine with upper 9 and lower 9A semicircular wall parts defining, together, a circular profile 10 which has a general diameter measure which is a little smaller than the diameter measure presented by the circular opening A made in the wall of the block B, where the wall box 1 should be mounted.

From the above mentioned circular profile 10 the internal walls 11 develop from the box to wall 1, which, in their turn, continue in the rear walls 12, where they are incorporated to openings 13 to receive the conduits (not shown).

Each of the structural reinforcements 8 has an oblique cut 14 reaching the proximities of the rear face plan 15 of edge 16 corresponding to the semicircular flaps 4, the referred oblique cut 14 coincides with the alignment of the hole bearing threads 6, where a corresponding expansion screw 7 is mounted.

The oblique cut 14 provided in each of the structural reinforcements 8 creates a corresponding block 17, whose external face 18 has a retention teeth standard 19, being the referred blocks 17 defined in such a way to be susceptible to lateral displacement in relation to the immovable ones and corresponding structural reinforcements 8 from which they are part due to the action of the respective expansion screws 7, as it will be better explained.

The socket box 1, as any conventional socket box, has an internal space E intended for the electric wires arriving or leaving the box, as well as it should also house the internal structures and connections of the functional component which is mounted in the box, the functional component which can be represented by a switch (simple, double, etc.), electric socket or another necessary device.

The socket box as addressed here has a transitory cap 20 which is mounted to the opening of space E, being intended to prevent the mortar M, which is applied to the wall surface after box 1 has been mounted, from entering the box itself.

The transitory cap 20 is removed after the mortar M is dry; for removal, the cap is provisioned, in its structure, with a flexible shaft 21, which is designed to extend beyond the mortar M which it is still fresh, allowing thus that even if box 1 is fully covered by the abovementioned mortar, the transitory cap 20 can be easily found and removed at the right time.

The socket box 1 as addressed here, as mentioned before, operates by the principle of expanding its structure, an effect which is obtained upon the introduction of the expanding screws 7 in the respective threaded holes 6, being that the advance of the mentioned screws 7 causes the displacement of the corresponding block 17 due to the provision of the oblique cuts 14.

At first, the socket box 1, not expanded yet, should be mounted in the circular opening A made in block B's wall, being that such mounting is performed on a narrow way due to the little difference existing between the external diameter of the region corresponding to the box's circular profile 10 the internal diameter of opening A made in block B.

Following the assembly of box 1, its alignment can be verified concerning the straight edges 22 provided in its front face; such edge can be used to allow the positioning of a level instrument (not shown) guaranteeing the vertical alignment of the box.

In case the use of the level instrument reveals that correction is required, a pair of pliers of similar tool can be used to promote the turn of the wall by acting on the internal projection 23 incorporated in its bottom.

Thus, by using a pair of pliers, the abovementioned internal projection 23 can be fastened serving as a pivoting point for the wall box 1 as a whole.

Once box 1 alignment is corrected, it can then be fixed to block B; such fixation is obtained due to the displacement of blocks 17 cause by the respective expansion screws 7, being that each screw 7, when advancing, cause the retention teeth 19 from its respective block 17 are compressed against the corresponding portion of opening A's wall made in block B.

In general, the socket box 1 enters on a tight way in opening A made in block B's wall and can then be fixed to the same by expanding its structure.

The figures showing this invention patent application show, concerning the socket box 1, two expansion points, which do not limit it protection range, once the box as addressed here can have a lower (one) or higher (three or more) number of these expansion points.

As noted above, the socket box as addressed here has a fixation system which is substantially simpler, efficient and practical than the systems adopted by the boxes belonging to the state of the art.

Figure 5:
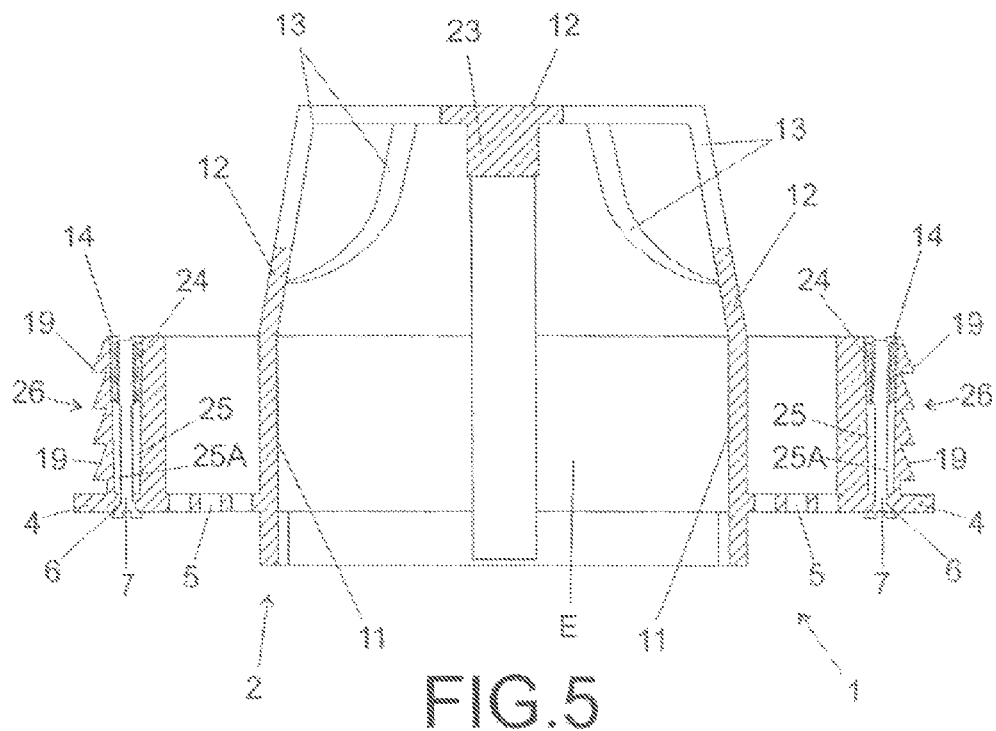
FIG. 5 shows a schematic cut view of a second form of accomplishing the socket box as addressed here, being the same on a stage before its expansion.
Figure 5A:
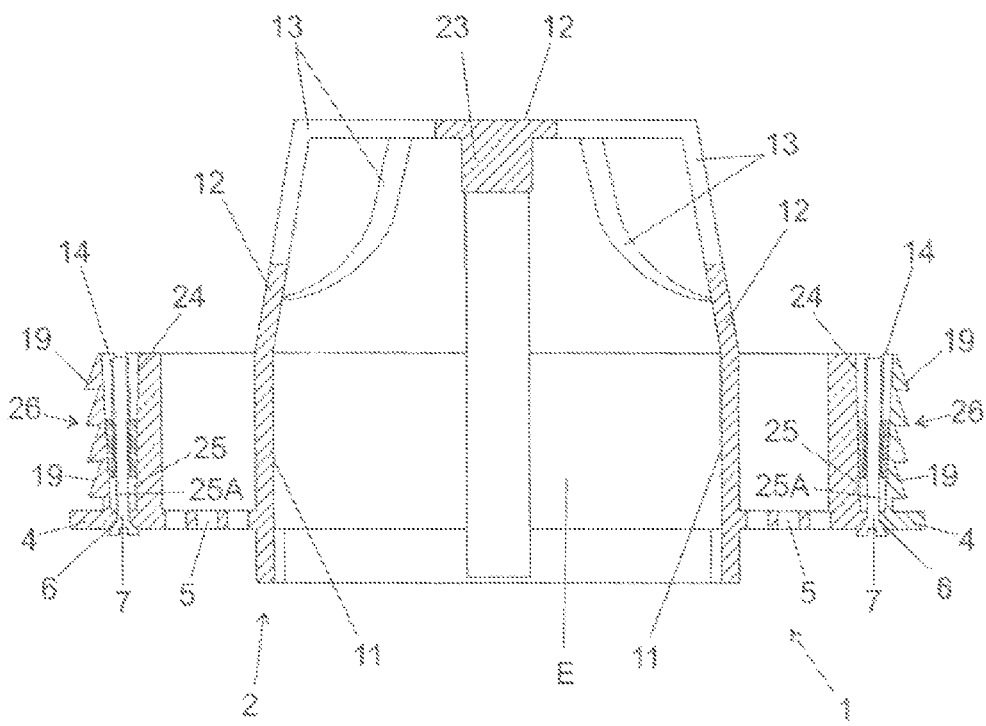
FIG. 5A shows a similar view to that shown in FIG. 5, being the socket box in its expansion condition.

This invention patent application further consider another way to accomplish the expansion effect presented by box 1, which can be especially understood through FIGS. 5 and 5A, where it can be noted the fact that the expansion screws 7 are previously threatened in mobile blocks 24, which are mounted in inner cavities 25 with ramps provided in box 1's structure, the referred mobile blocks 24 are subject to displacement as screws 7 are turned.

FIG. 5 shows a cut of the second modality of accomplishment for the box as addressed here, where its two mobile blocks 24 are positioned in its initial point; such point coincides with the non-expanding condition o box 1.

In FIG. 5A, the same mobile blocks 24 are shown in an advance condition over the inner cavities 25, being that such advance, due to the inner cavities 25, have a progressively decreased space (ramp 25A) in the measure of the proximity with box 1's front face, cause the displacement effect of portion 26 of the wall surrounding socket box 1, thus determining that the retention teeth 19 foreseen in portion 26 are forced to fasten against opening A foreseen in block B.

The second accomplishment way, presented in FIGS. 5 and 5A, also operates through the same effect of expanding the socket box's structure; this fact, as verified concerning the first accomplishment way (shown in FIGS. 1 to 4) is reverted in a more practical, rapid and efficient solution if compared to the solutions belonging to the state of the art.

The invention claimed is:

1. A socket box, intended to be mounted in a circular opening made in a wall of a block by using a drilling machine equipped with a hole saw, the socket box comprising: a main body made of injected plastic including a rectangular front edge continuing in two semicircular lateral flaps, each of them with a number of pass-through holes intended to retain mortar applied to the wall's surface where the box is mounted and also on the box; each of the semicircular flaps further has a corresponding hole provided with threads receiving a corresponding expansion screw; the main body, through its rear face, incorporates structural reinforcements compatible with a contour of each of the semicircular flaps, such structural reinforcements have a continuity and concordance with upper and lower semicircular wall parts defining, together, a circular profile presenting a measure of a general diameter smaller than a diameter measure presented by the circular opening made in block's wall; from the circular profile a plurality of internal walls of a wall box are developed, which continue in a plurality of rear walls, where a plurality of openings are incorporated to assemble a plurality of conduits; each of the structural reinforcements have an oblique cut reaching proximities of a rear face plan of an edge corresponding to the semicircular flaps, the referred oblique cut coincides with an alignment of the threaded hole, where a corresponding expansion screw is mounted; the oblique cut provided in each of the structural reinforcements creates a corresponding block, whose external face has a retention teeth standard the blocks defined in such a way being subject to lateral displacement with respect to immovable and corresponding structural reinforcements from which they are part due to action of the respective expansion screws; an internal projection is foreseen in the rear wall.

2. A socket box, according to claim 1, wherein where the expansion screws are previously threaded in mobile blocks, which are mounted in inner cavities with ramp provided in the box structure, the referred mobile blocks are subject to displacement as the screws are turned; the mobile blocks when moved by the expansion screws cause a displacement effect of corresponding portions of the wall surrounding the socket box, determining that the retention teeth from each of the portions are forced to fasten against the opening foreseen in block.

3. A socket box, according to claim 1, further comprising a transitory cap which is mounted along an opening of to space, wherein the transitory cap is equipped with a flexible shaft portion.

\* \* \* \* \*